United States Patent
Ishizaki et al.

(10) Patent No.: US 11,906,372 B2
(45) Date of Patent: Feb. 20, 2024

(54) CAPACITANCE SENSOR AND MEASUREMENT DEVICE

(71) Applicants: HONDA MOTOR CO., LTD., Tokyo (JP); The University of British Columbia, Vancouver (CA)

(72) Inventors: Ryusuke Ishizaki, Wako (JP); Mirza Saquib Sarwar, Vancouver (CA); John D. W. Madden, Vancouver (CA)

(73) Assignees: Honda Motor Co., Ltd., Tokyo (JP); The University of British Columbia, Vancouver (CA)

( * ) Notice: Subject to any disclaimer, the term of this patent is extended or adjusted under 35 U.S.C. 154(b) by 59 days.

(21) Appl. No.: 17/573,931

(22) Filed: Jan. 12, 2022

(65) Prior Publication Data

US 2022/0221349 A1  Jul. 14, 2022

(30) Foreign Application Priority Data

Jan. 14, 2021 (JP) .................................. 2021-004229

(51) Int. Cl.
  *G01L 1/14* (2006.01)
  *G01L 5/165* (2020.01)
  *G01D 5/241* (2006.01)
  *G06F 3/044* (2006.01)

(52) U.S. Cl.
  CPC .............. *G01L 1/142* (2013.01); *G01D 5/241* (2013.01); *G01L 5/165* (2013.01); *G06F 3/044* (2013.01)

(58) Field of Classification Search
  CPC ......... G01L 1/142; G01L 1/144; G01L 1/146; G01L 1/148; G01L 5/165; G01L 9/0072; G01L 9/0073; G01L 9/0075; G01L 9/12; G01D 5/241
  See application file for complete search history.

(56) References Cited

U.S. PATENT DOCUMENTS

| | | | | |
|---|---|---|---|---|
| 9,222,846 B2* | 12/2015 | Lim | .................. | G01L 1/142 |
| 2013/0234734 A1* | 9/2013 | Iida | .................. | G01L 1/146 |
| | | | | 324/661 |
| 2014/0267153 A1* | 9/2014 | Heim | .................. | G06F 3/0213 |
| | | | | 345/174 |
| 2015/0346907 A1* | 12/2015 | Nakajima | ............ | G06F 3/0445 |
| | | | | 345/174 |
| 2016/0231098 A1* | 8/2016 | Otaka | .................. | G01B 7/22 |
| 2017/0068383 A1* | 3/2017 | Chern | .................. | G06F 3/044 |
| 2017/0371447 A1* | 12/2017 | Fukushima | ........ | G06F 3/0446 |
| 2020/0159352 A1* | 5/2020 | Shimada | ............ | G06F 3/0416 |

FOREIGN PATENT DOCUMENTS

| | | | |
|---|---|---|---|
| JP | 2014-115282 A | | 6/2014 |
| JP | 2016090230 A | * | 5/2016 |
| WO | WO-2014080924 A1 | * | 5/2014 ........... G06F 3/0414 |

* cited by examiner

*Primary Examiner* — Herbert K Roberts

(74) *Attorney, Agent, or Firm* — Carrier, Shende & Associates P.C.; Joseph P. Carrier; Fulchand P. Shende

(57) ABSTRACT

The capacitance sensor 1 includes a self-capacitance electrode 5, first electrodes 3 (3(1) to 3(4)), and a second electrode 4 which are arranged being separated from each other in a thickness direction of an elastically deformable base material 2 formed by a dielectric. The self-capacitance electrode 5 is connected to a first connection portion 10*a* for measuring capacitance by a self-capacitance method and a grounded second connection portion 10*b* via a switch 10 so as to be selectively connected to the first connection portion 10*a* and the second connection portion 10*b*.

4 Claims, 4 Drawing Sheets

CAPACITANCE SENSOR AND MEASUREMENT DEVICE

BACKGROUND

Technical Field

The present invention relates to a capacitance sensor and a measurement device using the capacitance sensor.

Related Art

Conventionally, there is known a capacitance sensor having a structure in which an elastically deformable dielectric is interposed between a first electrode and a second electrode constituting a capacitor, for example, as described in JP 2014-115282 A and U.S. Pat. No. 9,222,846 B2. The sensors disclosed in JP 2014-115282 A and U.S. Pat. No. 9,222,846 B2 include a plurality of first electrodes attached to a first substrate and a plurality of second electrodes attached to a second substrate. When a normal force or a shearing force acts on the sensor, the dielectric is deformed. As a result, relative displacement between the first electrodes and the second electrodes occurs, thereby causing a change in capacitance between the first electrodes and the second electrodes. The sensor detects the normal force and the shearing force acting on the sensor based on the change in capacitance.

SUMMARY

The inventor of the present application has developed a capacitance sensor having a configuration in which a first electrode and a second electrode are arranged on a base material (base of the sensor) formed by a dielectric to be elastically deformable, being separated from each other in a thickness direction of the base material, and a third electrode and a fourth electrode are arranged closer to a front surface side of the base material than the first electrode and the second electrode so as to be aligned along the front surface of the base material.

This capacitance sensor can detect an external force such as a compression force or a shear force acting on the base material on the basis of a change in the measurement value of capacitance between the first electrode and the second electrode. The capacitance sensor can also detect the approach of an external object to the front surface of the base material and the degree of proximity of the external object based on a change in the measurement value of capacitance between the third electrode and the fourth electrode.

In this case, the capacitance between the first electrode or the second electrode and the external object approaching the front surface of the base material will cause an error in the measurement value of the capacitance between the first electrode and the second electrode. Therefore, a grounded electrostatic shielding member is arranged between the third and fourth electrodes and the first and second electrodes.

Accordingly, in the thus configured capacitance sensor, the third and fourth electrodes, the electrostatic shielding member, the first electrode, and the second electrode are aligned from the front surface side of the base material with spacings therebetween in the thickness direction of the base material. Therefore, the thickness of the base material tends to be large. This is likely to cause a hindrance to thinning or downsizing of a capacitance sensor.

The present invention has been made in view of such a background, and an object of the present invention is to provide a capacitance sensor configured to be capable of detecting the approach of an external object and an external force received from the external object, and capable of achieving thickness reduction and downsizing. Another object is to provide a measurement device using the capacitance sensor.

In order to achieve the above object, a capacitance sensor of the present invention includes:

an elastically deformable base material formed by a dielectric;

at least one self-capacitance electrode arranged in contact with the base material so as to be capable of detecting, by a self-capacitance method, capacitance between the self-capacitance electrode and an external object that is outside the base material and can approach a front surface of the base material; and at least one first electrode separated from the self-capacitance electrode on a side farther away from the front surface of the base material than the self-capacitance electrode in a thickness direction of the base material, and arranged in a state of being in contact with the base material; and at least one second electrode separated from the first electrode on a side farther away from the front surface of the base material than the first electrode in the thickness direction of the base material, arranged in a state of being in contact with the base material having the base material interposed between the first electrode and the second electrode, and arranged so as to have a portion overlapping with the first electrode when viewed in a direction of spacing from the first electrode, wherein the self-capacitance electrode is connected to a first connection portion for measurement of capacitance by the self-capacitance method and a grounded connection portion via a switch such that the self-capacitance electrode can be selectively connected to the first connection portion and the grounded second connection portion (first aspect of the present invention).

According to the first aspect of the present invention, when the switch is operated so as to connect the self-capacitance electrode to the first connection portion, it is possible to measure the capacitance between the external object approaching the front surface of the base material and the self-capacitance electrode by the self-capacitance method. Then, it is possible to detect the approach of the external object to the front surface of the base material on the basis of the measurement value of the capacitance.

When the switch is operated so as to connect the self-capacitance electrode to the second connection portion, the self-capacitance electrode is grounded via the second connection portion. Therefore, the self-capacitance electrode can function as a member for electrostatic shielding between the first electrode or the second electrode and an external object approaching or contacting the front surface of the base material.

Then, when the self-capacitance electrode is grounded as described above, it is possible to measure the capacitance between the first electrode and the second electrode while reducing the influence of the capacitance between the first electrode or the second electrode and the external object approaching the front surface of the base material. Therefore, it is possible to appropriately detect the external force received by the base material from the external object in contact with the base material, on the basis of the measurement value of the capacitance between the first electrode and the second electrode in a state where the self-capacitance electrode is grounded.

Further, by switching control of the switch, the self-capacitance electrode serves as an electrode for measuring capacitance between the self-capacitance electrode and the external object and also serves as a member for electrostatic shielding between the first electrode or the second electrode and the external object. This eliminates the need to separately provide a member for electrostatic shielding between the first electrode or the second electrode and the external object, between the self-capacitance electrode and the first and second electrodes.

Therefore, the capacitance sensor of the first aspect of the present invention can detect the approach of an external object and an external force from the external object, and achieve thickness reduction and downsizing.

In the first aspect of the present invention, the self-capacitance electrode is preferably arranged so as to entirely cover the first electrode and the second electrode when viewed from the front surface side of the base material in the direction of spacing between the first electrode and the second electrode (second aspect of the present invention).

According to this, when the switch is operated so as to ground the self-capacitance electrode, it is possible to more appropriately realize electrostatic shielding between the external object approaching the front surface of the base material and the first and second electrodes by the self-capacitance electrode.

Next, a measurement device of the present invention includes:
the capacitance sensor according to the first or second aspect of the present invention; the switch; and
a first measurement unit configured to measure capacitance between the self-capacitance electrode and the external object by the self-capacitance method when the self-capacitance electrode is connected to the first connection portion via the switch; and
a second measurement unit configured to measure capacitance between the first electrode and the second electrode when the self-capacitance electrode is connected to the second connection portion via the switch; and
a control unit configured to perform switching control of the switch (third aspect of the present invention).

According to this, the measurement of the capacitance between the self-capacitance electrode and the external object by the first measurement unit and the measurement of the capacitance between the first electrode and the second electrode by the second measurement unit can be executed in accordance with the switching state of the switch.

In the third invention, a mode can be adopted in which the control unit is configured to perform switching control of the switch so as to periodically switch the connection between the self-capacitance electrode and the first connection portion or the second connection portion, and the first measurement unit and the second measurement unit are configured to periodically execute the respective measurement processing (fourth aspect of the present invention).

According to this, the measurement of the capacitance between the self-capacitance electrode and the external object by the first measurement unit and the measurement of the capacitance between the first electrode and the second electrode by the second measurement unit can be executed periodically at different timings. Therefore, it is possible to sequentially observe a change in the state of an external object approaching the front surface of the base material and a change in an external force from the external object acting on the base material.

In the fourth aspect of the present invention, it is preferable that the control unit is configured to execute a first determination processing of determining whether the external object is in a state of continuous non-contact with the front surface of the base material on the basis of a measurement value of at least one of the capacitances measured by the first measurement unit and the second measurement unit in each cycle of periodic switching control of the switch, and if a determination result of the first determination processing is affirmative, make a time width for connecting the self-capacitance electrode to the first connection portion longer than a time width in a case where a determination result of the first determination processing is negative in each cycle of the periodic switching control of the switch (fifth aspect of the present invention).

According to this, in a continuous non-contact state of the external object with the front surface of the base material, a time width in which the capacitance can be measured by the first measurement unit is longer than that in a case where the external object is not in the continuous non-contact state. This makes it possible to enhance the reliability of the measurement value of the capacitance (capacitance between the self-capacitance electrode and the external object). Therefore, it is possible to appropriately detect the state of an external object approaching the front surface of the base material, the degree of proximity, and the like from the measurement value of the capacitance.

In the fifth aspect of the present invention, the control unit may be configured to, when the determination result of the first determination processing is affirmative, make the time width for connecting the self-capacitance electrode to the first connection portion longer than the time width for connecting the self-capacitance electrode to the second connection portion in each cycle of the periodic switching control of the switch (sixth aspect of the present invention).

According to this, among the time widths of cycles of switching control of the switch, the time width in which the capacitance can be measured by the first measurement unit can be made as long as possible. Therefore, it is possible to measure the capacitance (capacitance between the self-capacitance electrode and the external object) while reducing the transient influence as much as possible. As a result, the reliability of the measurement value of the capacitance can be appropriately enhanced.

In the fourth to sixth aspects of the present invention, it is preferable that the control unit is configured to execute a second determination processing of determining whether the external object is in a state of continuous contact with the front surface of the base material on the basis of a measurement value of at least one of the capacitances measured by the first measurement unit and the second measurement unit in each cycle of periodic switching control of the switch, and if a determination result of the second determination processing is affirmative, make a time width for connecting the self-capacitance electrode to the second connection portion longer than a time width in a case where a determination result of the second determination processing is negative in each cycle of the periodic switching control of the switch (seventh aspect of the present invention).

According to this, in the continuous contact state of the external object with the front surface of the base material, the time width in which the capacitance can be measured by the second measurement unit is longer than that in a case where the external object is not in the continuous contact state. This makes it possible to enhance the reliability of the measurement value of the capacitance (capacitance between the first electrode and the second electrode). Therefore, it is possible to appropriately detect the state of an external object approaching the front surface of the base material, the degree of proximity, and the like from the measurement value of the capacitance.

In the seventh aspect of the present invention, the control unit may be configured to, when the determination result of the second determination processing is affirmative, make the time width for connecting the self-capacitance electrode to the second connection portion longer than the time width for connecting the self-capacitance electrode to the first connection portion in each cycle of the periodic switching control of the switch (eighth aspect of the present invention).

According to this, among the time widths of cycles of switching control of the switch, the time width in which the capacitance can be measured by the second measurement unit can be made as long as possible. Therefore, it is possible to measure the capacitance (capacitance between the first electrode and the second electrode) while reducing the transient influence as much as possible. As a result, the reliability of the measurement value of the capacitance can be appropriately enhanced.

DETAILED DESCRIPTION

Figure 1:
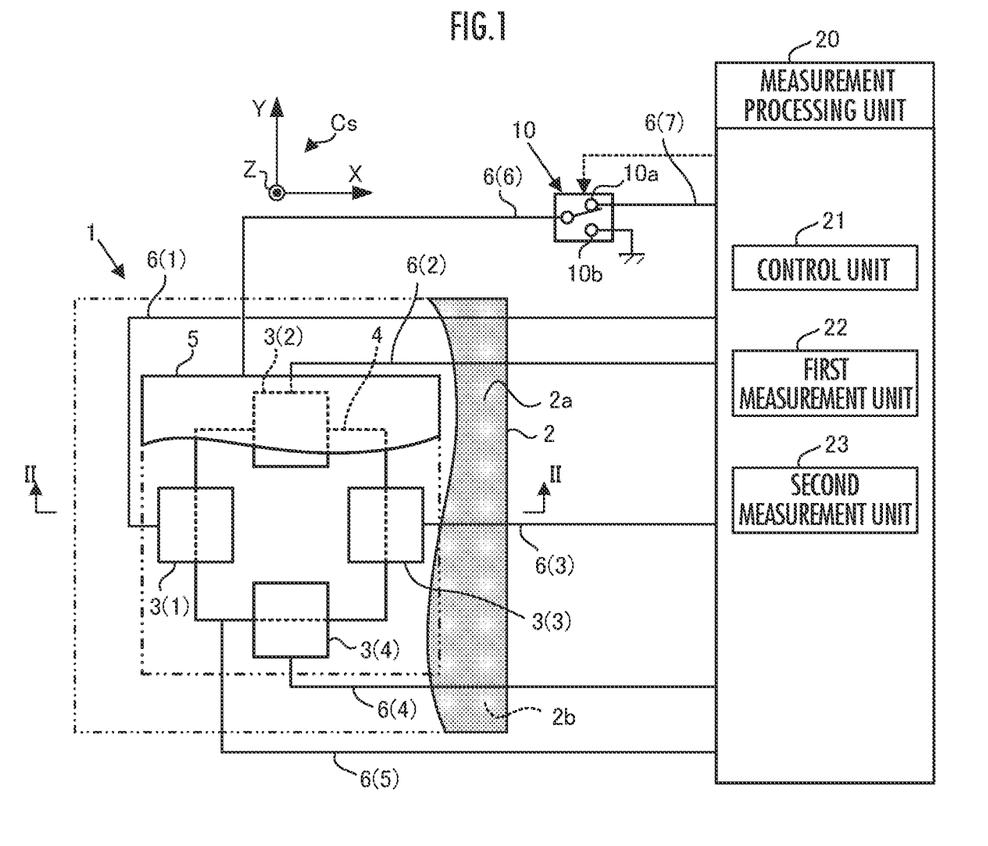
FIG. 1 is a diagram illustrating a capacitance sensor according to an embodiment in plan view and illustrating an overall configuration of a measurement device including the capacitance sensor.
Figure 2:
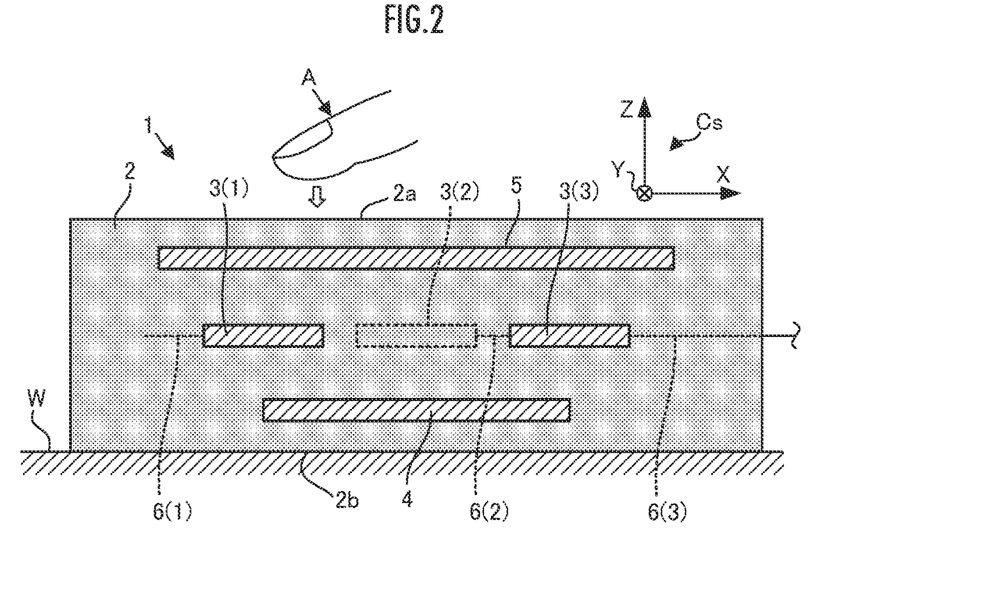
FIG. 2 is a cross-sectional view taken along line II-II in FIG. 1.

An embodiment of the present invention will be described below with reference to FIGS. 1 to 5B. As illustrated in FIG. 1, a measurement device of the present embodiment includes a capacitance sensor 1 (hereinafter, it may be simply referred to as sensor 1), a switch 10, and a measurement processing unit 20. The sensor 1 includes a base material 2, a first electrode 3(3(1), 3(2), 3(3), and 3(4)), a second electrode 4, and a self-capacitance electrode 5. In FIG. 1, a part of the base material 2 is sketched by dots, and the outer shape of the remaining part is indicated by a two-dot chain line. Further, a part of the self-capacitance electrode 5 is indicated by a solid line, and the outer shape of the remaining part is indicated by a two-dot chain line. In FIG. 2, the entire base material 2 is sketched by dots.

The base material 2 constitutes a base of the sensor 1, and is formed by an elastically deformable dielectric. For example, the base material 2 can be configured to be elastically deformable by a flexible dielectric including a gel of polyvinyl chloride (PVC), polyvinylidene fluoride (PVDF), polydimethylsiloxane (PDMS), a silicon-based resin, a urethane-based resin, an epoxy-based resin, or a composite material thereof.

In the present embodiment, the base material 2 is formed in a shape having a substantially constant thickness, for example, a rectangular parallelepiped shape. Then, as illustrated in FIG. 2, one surface 2b (hereinafter, referred to as a back surface 2b of the base material 2) of two surfaces 2a and 2b as seen in the thickness direction of the base material 2 is fixed to the surface of an arbitrary attachment target object W.

For example, if the sensor 1 is used as a tactile sensor for detecting a contact force or the like, the back surface 2b of the base material 2 can be fixed to the surface of the attachment target object W such as a robot hand. In this case, the other surface 2a (hereinafter, referred to as front surface 2a of the base material 2) of the base material 2 in the thickness direction is a surface to contact an external object A.

Each of the first electrode 3, the second electrode 4, and the self-capacitance electrode 5 is made of a conductor. For example, each of the first electrode 3, the second electrode 4, and the self-capacitance electrode 5 may include a conductor made of a metal such as carbon, silver, gold, or a liquid metal, a thiophene-based conductive polymer, a conductive resin such as polystyrene sulfonic acid (PSS), or a composite material thereof.

The sensor 1 includes one or more first electrodes 3 and one or more second electrodes 4. In the present embodiment, the sensor 1 includes, for example, four first electrodes 3(1), 3(2), 3(3), and 3(4) and one second electrode 4.

The second electrode 4 is arranged in a state where at least a part thereof is in contact with the base material 2. Specifically, in the present embodiment, the second electrode 4 is formed in, for example, a rectangular plate shape. As illustrated in FIG. 2, the second electrode 4 is embedded in the base material 2 in a posture parallel to the front and back surfaces 2a and 2b of the base material 2 at a position closer to the back surface 2b as seen in the thickness direction of the base material 2. Therefore, the second electrode 4 is arranged in a state where substantially the entire outer surface thereof is in contact with the base material 2. However, of both surfaces of the second electrode 4 as seen in the thickness direction, for example, the whole or a part of the surface facing the back surface 2b of the base material 2 may be exposed to the outside of the base material 2.

In the following description, for convenience, assuming a three-axis orthogonal coordinate system (XYZ coordinate system) Cs in which the thickness direction of the base material 2 is the Z-axis direction as illustrated in FIGS. 1 and 2, the thickness direction of the base material 2 may be referred to as Z-axis direction. With regard to X-axis direction and Y-axis direction of the coordinate system Cs, an extending direction of two sides parallel to each other among four sides of the second electrode 4 viewed in the Z-axis direction (the left-right direction on the plane of FIG. 1) is defined as X-axis direction, and an extending direction of the other two sides (the up-down direction on the plane of FIG. 1) is defined as Y-axis direction.

Each of the four first electrodes 3(1) to 3(4) is disposed being separated from the second electrode 4 in the Z-axis direction (the thickness direction of the base material 2) in a state in which at least a part thereof is in contact with the base material 2 while having the base material 2 interposed between each of the four first electrodes 3(1) to 3(4) and the second electrode 4. Further, when viewed in the Z-axis direction, each of the first electrodes 3(1) to 3(4) is arranged such that a part of each of the first electrodes 3(1) to 3(4) overlaps with the second electrode 4.

Specifically, in the present embodiment, each of the first electrodes 3(1) to 3(4) is formed in, for example, a square plate shape of a predetermined size smaller in area than the second electrode 4. Each of the first electrodes 3(1) to 3(4) is embedded in the base material 2 in a posture parallel to the front and back surfaces 2a and 2b of the base material 2 (posture orthogonal to the Z-axis direction) at a position closer to the front surface 2a of the base material 2 as seen in the Z-axis direction.

As a result, each of the first electrodes 3(1) to 3(4) is substantially entirely in contact with the base material 2, and is separated from the second electrode 4 in the Z-axis direction with the base material 2 interposed between the first electrode 3 and the second electrode 4. Therefore, the Z-axis direction can also be said to be a direction of spacing between each of the first electrodes 3(1) to 3(4) and the second electrode 4. The second electrode 4 is arranged being separated from the first electrodes 3(1) to 3(4) on a side farther away from the front surface 2a of the base material 2 than the first electrodes 3(1) to 3(4) in the Z-axis direction. In the present embodiment, each of the first electrodes 3(1) to 3(4) is embedded in the base material 2. Therefore, substantially the entire first electrodes 3(1) to 3(4) are each in contact with the base material 2.

More specifically, the first electrodes 3(1) to 3(4) have a constant spacing from the second electrode 4 as seen in the Z-axis direction, and are positioned on the middle parts of the four corresponding sides of the second electrode 4 when viewed in the Z-axis direction from the front surface 2a side of the base material 2. Each of the first electrodes 3(1) to 3(4) is arranged such that two sides parallel to each other among the four sides thereof extend in one axial direction of the X-axis direction and the Y-axis direction and the other two sides extend in the other axial direction when viewed in the Z-axis direction from the front surface 2a side of the base material 2. Each of the first electrodes 3(1) to 3(4) is arranged such that a part thereof overlaps with the second electrode 4 and the remaining part thereof protrudes outward from the second electrode 4 when viewed in the Z-axis direction from the front surface 2a side of the base material 2.

As described above, the first electrodes 3(1) to 3(4) and the second electrode 4 are arranged on the base material 2. Therefore, an overlapping portion of each of the first electrodes 3(1) to 3(4) with the second electrode 4 (overlapping portion when viewed in the Z-axis direction) constitutes a capacitor having the base material 2 as a dielectric between the overlapping portions. In this case, the capacitor formed at the overlapping portion of each of the first electrodes 3(1) to 3(4) with the second electrode 4 has capacitance corresponding to the area of the overlapping portion and the spacing between the overlapping portions (spacing as seen in the Z-axis direction).

When a shear force acts on the base material 2 in the X-axis direction, the base material 2 is elastically deformed such that the first electrodes 3(1) to 3(4) are displaced in the X-axis direction relative to the second electrode 4 according to the magnitude of the shear force. Therefore, among the first electrodes 3(1) to 3(4), the area of the portion, overlapping with the second electrode 4, of each of the two first electrodes 3(1) and 3(3) aligned in the X-axis direction changes. Accordingly, the capacitance between each of the first electrodes 3(1), 3(3) and the second electrode 4 changes. At this time, the area of the overlapping portion of each of the two first electrodes 3(2), 3(4) arranged in the Y-axis direction with the second electrode 4 does not change Therefore, the capacitance between each of the first electrodes 3(2) and 3(4) and the second electrode 4 is kept substantially constant.

When a shear force acts on the base material 2 in the Y-axis direction, the base material 2 is elastically deformed such that the first electrodes 3(1) to 3(4) are displaced in the Y-axis direction relative to the second electrode 4 according to the magnitude of the shear force. Therefore, the area of the portion of each of the two first electrodes 3(2), 3(4) aligned in the Y-axis direction among the first electrodes 3(1) to 3(4) overlapping with the second electrode 4 changes. Accordingly, the capacitance between each of the first electrodes 3(2), 3(4) and the second electrode 4 changes. At this time, the area of the overlapping portion of each of the two first electrodes 3(1), 3(3) arranged in the X-axis direction with the second electrode 4 does not change Therefore, the capacitance between each of the first electrodes 3(1) and 3(3) and the second electrode 4 is kept substantially constant.

When a load (compressive force or tensile force) in the Z-axis direction acts on the base material 2, the base material 2 is elastically deformed such that the first electrodes 3(1) to 3(4) are displaced in the Z-axis direction relative to the second electrode 4 according to the magnitude of the load. Therefore, the spacing between the overlapping portions of the first electrodes 3(1) to 3(4) with the second electrode 4 as seen in the Z-axis direction changes. Accordingly, the capacitance between each of the first electrodes 3(1) to 3(4) and the second electrode 4 changes.

As described above, the electrostatic capacitance of the portion of each of the first electrodes 3(1) to 3(4) overlapping with the second electrode 4 changes according to the elastic deformation of the base material 2 caused by the shear force applied in two axial directions of the X-axis direction and the Y-axis direction or the load applied in the Z-axis direction. Therefore, by measuring these capacitance, it is possible to measure the amount of elastic deformation (stress strain) of the base material 2, the shearing force acting on the base material 2 in the two axial directions (the X-axis direction and the Y-axis direction), or the load applied in the Z-axis direction, from the measurement values of the capacitance.

In order to perform such measurement, the first electrodes 3(1) to 3(4) and the second electrode are connected via each of the wiring lines 6(1) to 6(5), respectively, to the measurement processing unit 20 outside the base material 2. These wiring lines 6(1) to 6(5) are formed of conductors similar to those of the first electrodes 3(1) to 3(4) and the second electrode 4, respectively. The wiring lines 6(1) to 6(5) are extended from the first electrodes 3(1) to 3(4) and the second electrode 4, respectively, to the outside of the base material 2 through the inside of the base material 2 in appropriate wiring patterns.

In this case, the material of the wiring lines 6(1) to 6(5) may be the same as or different from the material of the first electrodes 3(1) to 3(4) and the second electrode 4. In each of the wiring lines 6(1) to 6(5), the portion inside the base material 2 and the portion outside the base material 2 may be made of conductors of different materials. All or a part of the portion outside the base material 2 of each of the wiring lines 6(1) to 6(5) may be, for example, a wiring line formed on a circuit board.

The self-capacitance electrode 5 is arranged at a Z-axis direction position closer to the front surface 2a of the base material 2 than the first electrodes 3(1) to 3(4) in a state where at least a part thereof is in contact with the base material 2. Specifically, in the present embodiment, the self-capacitance electrode 5 is formed in, for example, a square plate shape. As shown in FIG. 2, the self-capacitance electrode 5 is embedded in the base material 2 at a Z-axis direction position closer to the front surface 2a of the base material 2 than the first electrodes 3(1) to 3(4) in a posture (posture orthogonal to the Z-axis direction) parallel to the front and back surfaces 2a and 2b of the base material 2.

Therefore, the self-capacitance electrode 5 is arranged in a state where substantially the entire outer surface thereof is in contact with the base material 2. However, of both surfaces of the self-capacitance electrode 5 as seen in the thickness direction, for example, the whole or a part of the surface on the front surface 2a side of the base material 2 may be exposed to the outside of the base material 2.

Since the self-capacitance electrode 5 is arranged on the base material 2 as described above, the self-capacitance electrode 5 is positioned closer to the front surface 2a side of the base material 2 than the first electrodes 3(1) to 3(4) and the second electrode 4. Therefore, when an arbitrary external object A (an object outside the base material 2) approaches the front surface 2a of the base material 2 outside the base material 2, there can be formed a capacitor between the self-capacitance electrode 5 and the external object A that has capacitance varying according to the degree of proximity of the external object A to the front surface of the base material 2. The capacitance can be detected by a known self-capacitance method via the self-capacitance electrode 5.

The self-capacitance electrode 5 is arranged closer to the front surface 2a side of the base material 2 than the first electrodes 3(1) to 3(4) being separated away from the first electrodes 3(1) to 3(4). Therefore, the first electrodes 3(1) to 3(4) are arranged being separated from the self-capacitance electrode 5 on the side farther away from the front surface 2a of the base material 2 than the self-capacitance electrode 5.

As shown in FIG. 1, the self-capacitance electrode 5 is connected via a wiring line 6(6) to the switch 10 provided outside the base material 2. The wiring line 6(6) is made of a conductor similar to those of the wiring lines 6(1) to 6(6). The wiring line 6(6) is extended from the self-capacitance electrode 5 to the outside of the base material 2 through the inside of the base material 2.

The switch 10 includes, as connection destinations of the self-capacitance electrode 5, a first connection portion 10a for measuring capacitance by the self-capacitance method, and a second connection portion 10b grounded at a grounding place outside the base material 2. The switch 10 is configured to be able to selectively connect the self-capacitance electrode 5 connected via the wiring line 6(5) to either the first connection portion 10a or the second connection portion 10b. The switch 10 can be formed by, for example, a semiconductor switch, a relay, or the like. The switch 10 is connected to the measurement processing unit 20 so that the measurement processing unit 20 can perform switching control. The first connection portion 10a of the switch 10 is connected to the measurement processing unit 20 via a wiring line 6(7). The wiring line 6(7) can be configured in the same manner as the portions of the wiring lines 6(1) to 6(6) outside the base material 2.

The measurement processing unit 20 includes a power supply circuit, a processor such as a microcomputer, a memory (RAM, ROM, etc.), an interface circuit, and the like which are not illustrated. The measurement processing unit 20 may include the switch 10.

The measurement processing unit 20 has, as functions realized by the implemented hardware configuration and programs (software configuration), a function of a control unit 21 to perform switching control of the switch 10, a function of a first measurement unit 22 to measure capacitance between the self-capacitance electrode 5 and the external object A approaching the front surface 2a of the base material 2, and a function of a second measurement unit 23 to measure capacitance between each of the first electrodes 3(1) to 3(4) and the second electrode 4.

Although described in detail later, the control unit 21 can perform switching control of the switch 10 so as to alternately connect the self-capacitance electrode 5 to the first connection portion 10a and connect the self-capacitance electrode 5 to the second connection portion 10b in a constant cycle.

The first measurement unit 22 applies a measurement voltage between the self-capacitance electrode 5 and the grounding portion of the measurement processing unit 20 when the switch 10 is controlled to the first connection portion 10a side (when the self-capacitance electrode 5 is connected to the first connection portion 10a), and generates a detection signal in accordance with the capacitance between the self-capacitance electrode 5 and the external object A when the voltage is applied. The first measurement unit 22 is configured to be capable of measuring the capacitance from the detection signal by a self-capacitance method.

In this case, the capacitance between the self-capacitance electrode 5 and the external object A increases as the external object A approaches the front surface 2a of the base material 2. Therefore, it is possible to detect the degree of proximity of the external object A to the front surface 2a of the base material 2 from the measurement value of the capacitance. In addition, for example, when the measurement value of the capacitance exceeds a predetermined threshold, it is possible to detect the contact of the external object W with the front surface 2a of the base material 2.

The second measurement unit 23 applies a measurement voltage between each of the first electrodes 3(1) to 3(4) and the second electrode 4 when the switch 10 is controlled to the second connection portion 10b side (when the self-capacitance electrode 5 is connected to the second connection portion 10b and is grounded), and generates a detection signal in accordance with the capacitance between each of the first electrodes 3(1) to 3(4) and the second electrode 4 when the voltage is applied to each of the first electrodes 3(1) to 3(4). The second measurement unit 23 is configured to be capable of measuring the capacitance between each of the first electrodes 3(1) to 3(4) and the second electrode 4 from the detection signal.

In this case, as described above, the capacitance between each of the first electrodes 3(1) to 3(4) and the second electrode 4 changes according to the elastic deformation of the base material 2 due to the shear force acting on the base material 2 or the load applied in the Z-axis direction. Therefore, it is possible to detect the magnitude and direction of the shearing force acting on the base material 2 and the load applied in the Z-axis direction from the measurement value of the capacitance.

The capacitance is measured by the second measurement unit 23 when the self-capacitance electrode 5 is grounded via the switch 10. The self-capacitance electrode 5 to be grounded is arranged so as to cover the first electrodes 3(1)

to 3(4) and the second electrode 4 as viewed in the Z-axis direction. Therefore, even when the external object A is in close to or in contact with the front surface 2a of the base material 2, the self-capacitance electrode 5 functions as an electrostatic shielding member between the first electrodes 3(1) to 3(4) and second electrode 4 and the external object A.

This prevents the measurement value of the capacitance between each of the first electrodes 3(1) to 3(4) and the second electrode 4 from changing under the influence of the capacitance between the external object A and each of the first electrodes 3(1) to 3(4) or the second electrode 4. As a result, it is possible to enhance the reliability of the measurement value of the capacitance by the second measurement unit 23 (the reliability of the capacitance that changes according to the elastic deformation of the base material 2).

Next, the switching control of the switch 10 will be described more specifically. The control unit 21 of the measurement processing unit 20 acquires the measurement values of the capacitances measured by the first measurement unit 22 and the second measurement unit 23 in each constant cycle while performing the switching control of the switch 10 by the control unit 21 such that the self-capacitance electrode 5 is alternately connected to the first connection portion 10a and connected to the second connection portion 10b in the constant cycle.

The control unit 21 periodically executes a first determination processing of determining whether the external object A is in a continuous non-contact state with the front surface 2a (contact surface) of the base material 2 and a second determination processing of determining whether the external object A is in a continuous contact state with the front surface 2a of the base material 2.

The continuous non-contact state of the external object A with the front surface 2a of the base material 2 is more specifically a state in which the external object A is continuously not in contact with the front surface 2a of the base material 2 within the period of a predetermined time width. Similarly, the continuous contact state of the external object A with the front surface 2a of the base material 2 is more specifically a state in which the external object A is continuously in contact with the front surface 2a of the base material 2 within the period of a predetermined time width. In the present embodiment, the period of a predetermined time width is, for example, the period of a predetermined number of times (twice or more) of one cycle of the switching control of the switch 10.

The non-contact state of the external object A with the front surface 2a of the base material 2 may include not only a state in which the external object A is separated from the front surface 2a of the base material 2, but also a state in which the external object A is in slight contact with the front surface 2a of the base material 2 when the contact force between the external object A and the base material 2 is sufficiently minute ($\approx 0$).

In order to execute the first determination processing and the second determination processing, the control unit 21 determine whether the external object A is in contact with the front surface 2a of the base material 2 in each cycle of the switching control of the switch 10 as described below, on the basis of the measurement value of at least one of the capacitance measured by the first measurement unit 22 and the capacitance measured by the second measurement unit 23.

For example, the control unit 21 compares the measurement value of the capacitance (capacitance between the self-capacitance electrode 5 and the external object A) measured by the first measurement unit 22 with a predetermined threshold (hereinafter, referred to as a first threshold) in a period in which the switch 10 is controlled to the first connection portion 10a side within the period of each cycle of the switching control of the switch 10. The control unit 21 determines that the external object A is in contact with the front surface 2a of the base material 2 when the measurement value of the capacitance is larger than the first threshold value, and determines that the external object A is not in contact with the front surface 2a of the base material 2 when the measurement value of the capacitance is smaller than the first threshold value.

Alternatively, the control unit 21 estimates the load applied to the base material 2 in the Z axis direction (load applied in the compression direction of the base material 2) from the measurement value of the capacitance (capacitance between each of the first electrodes 3(1) to 3(4) and the second electrode 4) measured by the second measurement unit 23 in a period in which the switch 10 is controlled to the second connection portion 10b side within the period of each cycle of the switching control of the switch 10, and compares the estimation value of the load applied in the Z axis direction with a predetermined threshold (hereinafter, referred to as a second threshold). Then, the control unit 21 determines that the external object A is in contact with the front surface 2a of the base material 2 when the load applied in the Z-axis direction is larger than the second threshold value, and determines that the external object A is not in contact with the front surface 2a of the base material 2 when the load applied in the Z-axis direction is smaller than the second threshold value.

Alternatively, the control unit 21 may also determine whether the external object A is in contact with the front surface of the base material 2 on the basis of both the measurement value of the capacitance measured by the first measurement unit 22 and the measurement value of the capacitance measured by the second measurement unit 23.

For example, in each cycle of the switching control of the switch 10, the control unit 21 may determine that the external object A is in contact with the front surface 2a of the base material 2 when the measurement value of the capacitance measured by the first measurement unit 22 is larger than the first threshold and the load applied in the Z axis direction (load applied in the compression direction of the base material 2) estimated from the measurement value of the capacitance measured by the second measurement unit 23 is larger than the second threshold, and the control unit 21 may determine that the external object A is not in contact with the front surface 2a of the base material 2 in other cases.

Alternatively, in each cycle of the switching control of the switch 10, the control unit 21 may determine that the external object A is not in contact with the front surface 2a of the base material 2 when the measurement value of the capacitance measured by the first measurement unit 22 is smaller than the first threshold and the load applied in the Z axis direction (load applied in the compression direction of the base material 2) estimated from the measurement value of the capacitance measured by the second measurement unit 23 is smaller than the second threshold, and the control unit 21 may determine that the external object A is in contact with the front surface 2a of the base material 2 in other cases.

In each cycle of the switching control of the switch 10, the control unit 21 determines whether the external object A is in contact with the front surface 2a of the base material 2 as described above. The control unit 21 then executes the first determination processing and the second determination processing by using the determination results.

Figure 3A:
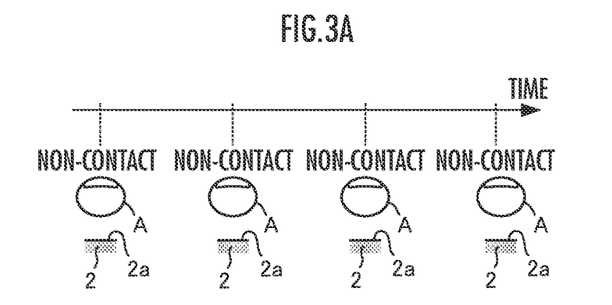
FIGS. 3A and 3B are diagrams respectively illustrating a first example of a state in which an external object is in contact with or in non-contact with a base material and a pattern of switching control of a switch corresponding to the first example.

In this case, in the first determination processing, for example, as shown in FIG. 3A, when determining that the external object A is not in contact with the front surface 2a of the base material 2 in each cycle of a period of a time width (for example, a period of four cycles) that is a predetermined number of times of one cycle of the switching control of the switch 10, the control unit 21 determines that the external object A is in a continuous non-contact state with the front surface 2a of the base material 2 (determines that the determination result of the first determination processing is affirmative). In other cases, the control unit 21 determines that the determination result of the first determination processing is negative (the external object A is not in the continuous non-contact state with the front surface 2a of the base material 2).

Figure 4A:
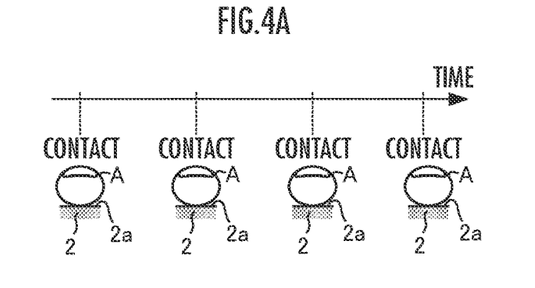
FIGS. 4A and 4B are diagrams respectively illustrating a second example of a state in which an external object is in contact with or in non-contact with a base material and a pattern of switching control of a switch corresponding to the second example.

In addition, in the second determination processing, for example, as shown in FIG. 4A, when determining that the external object A is in contact with the front surface 2a of the base material 2 in each cycle of the period of a time width (for example, a period of four cycles) that is a predetermined number of times of one cycle of the switching control of the switch 10, the control unit 21 determines that the external object A is in a continuous contact state with the front surface 2a of the base material 2 (determines that the determination result of the second determination processing is affirmative). In other cases, the control unit 21 determines that the determination result of the second determination processing is negative (the external object A is not in the continuous contact state with the front surface 2a of the base material 2).

Figure 5A:
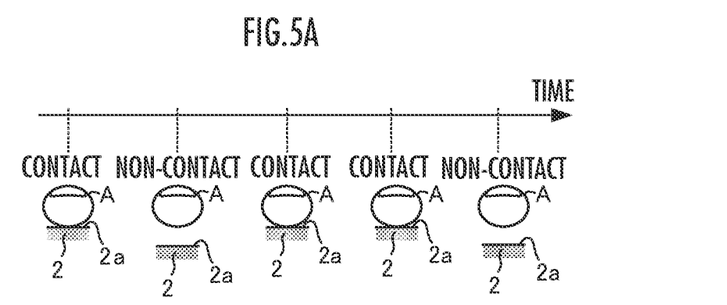
FIGS. 5A and 5B are diagrams respectively illustrating a third example of a state in which an external object is in contact with or in non-contact with a base material and a pattern of switching control of a switch corresponding to the third example.

Therefore, for example, as illustrated in FIG. 5A, when both the determination that the external object A is in contact with the front surface 2a of the base material 2 and the determination that the external object A is not in contact with the front surface 2a of the base material 2 are not continuous in the period of a time width (for example, a period of four cycles) that is a predetermined number of times of one cycle of the switching control of the switch 10, the control unit 21 determines that both the determination result of the first determination processing and the determination result of the second determination processing are negative.

Then, on the basis of the determination results of the first determination processing and the second determination processing, the control unit 21 determines a time width of a period in which the switch 10 is controlled to the first connection portion 10a side (a period in which the self-capacitance electrode 5 is connected to the measurement processing unit 20 via the switch 10) and a time width of a period in which the switch 10 is controlled to the second connection portion 10b side (a period in which the self-capacitance electrode 5 is grounded via the switch 10) in each cycle of the subsequent switching control of the switch 10.

Figure 3B:
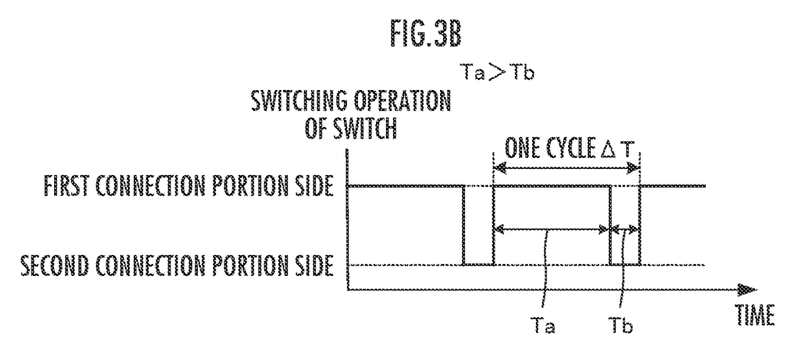

Specifically, when the determination result of the first determination process is affirmative (when determining that the external object A is in the continuous non-contact state with the front surface 2a of the base material 2), as illustrated in FIG. 3B, the control unit 21 determines a time width Ta of the period in which the switch 10 is controlled to the first connection portion 10a side and a time width Tb of the period in which the switch 10 is controlled to the second connection portion 10b side, to predetermined values, such that the time width Ta is longer than the time width Tb, in each period $\Delta T$ of the subsequent switching control of the switch 10.

This lengthens the time width (=Ta) in which the first measurement unit 22 can measure the capacitance between the self-capacitance electrode 5 and the external member A. Therefore, the capacitance between the self-capacitance electrode 5 and the external member A can be measured while appropriately reducing the influence of transient fluctuation. As a result, the reliability of the measurement value of the capacitance can be enhanced. Consequently, the accuracy of detection of approach of the external object A to the front surface 2a of the base material 2 and the degree of proximity can be enhanced.

When the time widths Ta and Tb are set such that Ta>Tb is satisfied as described above, it may be determined whether the external object A is in contact with the front surface 2a of the base material 2 on the basis of only the measurement value of the capacitance by the first measurement unit 22 or using the measurement value of the capacitance as the main reference data.

Figure 4B:
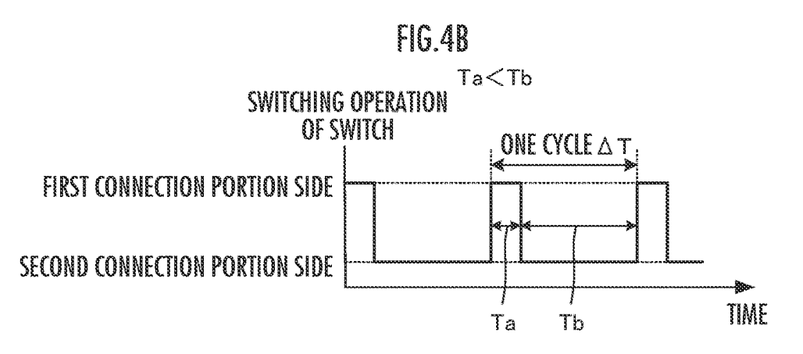

When the determination result of the second determination processing is affirmative (when determining that the external object A is in the continuous contact state with the front surface 2a of the base material 2), as illustrated in FIG. 4B, the control unit 21 determines the time width Ta of the period in which the switch 10 is controlled to the first connection portion 10a and the time width Tb of the period in which the switch 10 is controlled to the second connection portion 10b, to predetermined values, such that the time width Tb is longer than the time width Ta, in each period $\Delta T$ of the subsequent switching control of the switch 10.

This lengthens the time width (=Tb) in which the second measurement unit 23 can measure the capacitance between each of the first electrodes 3(1) to 3(4) and the second electrode. Therefore, when the external object A is in contact with the front surface 2a of the base material 2, the capacitance between each of the first electrodes 3(1) to 3(4) and the second electrode can be measured while appropriately reducing the influence of transient variation. As a result, the reliability of the measurement value of the capacitance can be enhanced. As a result, the accuracy of detection of the Z-axis direction load and the shear force from the external object A acting on the base material 2 can be enhanced.

When the time widths Ta and Tb are set such that Ta<Tb is satisfied as described above, it may be determined whether the external object A is in contact with or not in contact with the front surface 2a of the base material 2 on the basis of only the Z-axis direction load estimated from the measurement value of the capacitance by the second measurement unit 23 or by using the estimated value of the load as the main reference data.

Figure 5B:
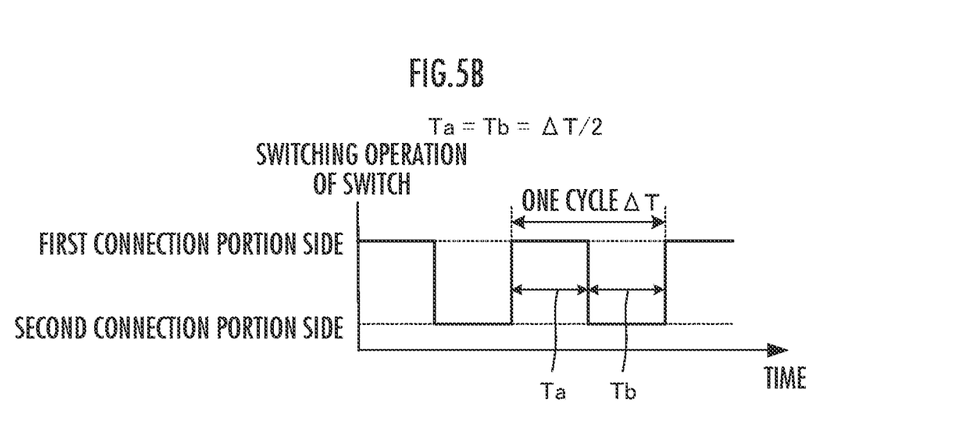

When both the determination result of the first determination processing and the determination result of the second determination processing are negative, as illustrated in FIG. 5B, the control unit 21 sets the time width Ta of the period in which the switch 10 is controlled to the first connection portion 10a so as to be shorter than that in a case where the determination result of the first determination processing is affirmative. The control unit 21 also sets the time width Tb of the period in which the switch 10 is controlled to the second connection portion 10b side so as to be shorter than that in a case where the determination result of the second determination processing is affirmative. For example, the control unit 21 determines both the time widths Ta and Tb to be a half of one period $\Delta T$ (=$\Delta T/2$).

This makes it possible to ensure reliability of the measurement value of the capacitance measured by the first measurement unit 22 and the measurement value of the capacitance measured by the second measurement unit 23 in a well-balanced manner. Therefore, even if the state of the external object A with respect to the front surface 2a of the base material 2 is changed from the situation in which both the determination result of the first determination processing and the determination result of the second determination processing are negative to either the continuous non-contact state or the continuous contact state, the state after the change can be appropriately detected by either the first determination processing or the second determination processing.

If the determination result of the first determination processing and the determination result of the second determination processing are both negative, the time widths Ta and Tb may be set to different time widths. For example, the time widths Ta and Tb may be set to different time widths by reflecting a difference between the time required for the capacitance measurement processing by the first measurement unit 22 and the time required for the capacitance measurement processing by the second measurement unit 23.

In the present embodiment, as described above, the switching control of the switch 10 is periodically performed. In this case, in each cycle of the switching control of the switch 10, when the determination result of the first determination processing is affirmative (when it is determined that the external object A is in the continuous non-contact state with the front surface 2a of the base material 2), the time width Ta of the period in which the switch 10 is controlled to the first connection portion 10a side (the period in which the self-capacitance electrode 5 is connected to the measurement processing unit 20) is set to a longer time width (>ΔT/2) than when the determination result is negative. Therefore, the reliability of the measurement value of the capacitance between the self-capacitance electrode 5 and the external object A by the first measurement unit 22 can be enhanced. Accordingly, the accuracy of detection of approach of the external object A to the front surface 2a of the base material 2 and the degree of proximity can be enhanced.

In addition, in each cycle of the switching control of the switch 10, when the determination result of the second determination processing is affirmative (when it is determined that the external object A is in the continuous contact state with the front surface 2a of the base material 2), the time width Ta of the period in which the switch 10 is controlled to the second connection portion 10b side (the period in which the self-capacitance electrode 5 is grounded) is set to a longer time width (>ΔT/2) than when the determination result is negative. Therefore, the reliability of the measurement value of the capacitance between each of the first electrodes 3(1) to 3(4) and the second electrode 4 by the second measurement unit 23 can be enhanced. Accordingly, the accuracy of detection of the Z-axis direction load and the shear force from the external object A acting on the base material 2 can be enhanced.

In addition, by switching control of the switch 10, the self-capacitance electrode 5 can function both as an electrode for measuring the capacitance between the self-capacitance electrode 5 and the external object A by the self-capacitance method and as a member for electrostatic shielding between the first electrodes 3(1) to 3(4) and the second electrode 4 and the external object A. Therefore, the thickness of the sensor 1 of the present embodiment can be reduced and the number of components of the sensor 1 can be decreased as compared with a case where the sensor is configured so as to realize these functions by different members. This achieves downsizing of the sensor 1.

Note that the present invention is not limited to the embodiments described above, and another embodiment can be adopted. Hereinafter, some other embodiments will be described as examples. For example, in the sensor 1 of the embodiments, the second electrode 4 is a single electrode, but the second electrode 4 may be divided into a plurality of electrodes.

In the sensor 1 of the above embodiment, the first electrode 3 is configured by four electrodes, and the second electrode 4 is configured by a single electrode. However, conversely, the first electrode may be configured by a single electrode, and the second electrode may be configured by four electrodes for example.

In the sensor 1 of the above embodiment, the first electrodes 3(3(1) to 3(4)) are arranged on the front surface 2a side of the base material 2, and the second electrode 4 is arranged on the back surface 2b side of the base material 2. Conversely, the first electrodes 3 (3(1) to 3(4)) may be arranged on the back surface 2b side of the base material 2, and the second electrode 4 may be arranged on the front surface 2a side of the base material 2.

In the sensor 1 of the above embodiment, the first electrodes 3 (3(1) to 3(4)) and the second electrode 4 are arranged such that the shear force acting in two axial directions of the X-axis direction and Y-axis direction and the load applied in the Z-axis direction can be measured. However, for example, the first electrode 3 and the second electrode 4 may be arranged such that the shear force acting in one axial direction and the load applied in the Z-axis direction can be measured.

For example, removing the first electrodes 3(2) and 3(4) aligned in the Y-axis direction and the wiring lines 6(2) and 6(4) connected thereto from the sensor 1 makes it possible to form a sensor in which the first electrodes 3(1), 3(3) and the second electrode 4 are arranged so as to measure the shear force acting in the X-axis direction and the load applied in the Z-axis direction can be measured.

In addition, for example, arranging a plate-shaped first electrode having an area smaller than that of the second electrode 4 so as to face the central portion of the second electrode 4 in the Z-axis direction makes it possible to form a sensor in which the first electrode and the second electrode are arranged so as to be capable of measuring only the load applied in the Z-axis direction.

What is claimed is:

1. A measurement device comprising:
    a switch.
    a capacitance sensor including:
        an elastically deformable base material formed by a dielectric;
        at least one self-capacitance electrode arranged in contact with the base material so as to be capable of detecting, by a self-capacitance method, capacitance between the base material and an external object that is outside the base material and can approach a front surface of the base material; and
        at least one first electrode separated from the self-capacitance electrode on a side farther away from the front surface of the base material than the self-capacitance electrode in a thickness direction of the base material, and arranged in a state of being in contact with the base material; and
        at least one second electrode separated from the first electrode on the side farther away from the front surface of the base material than the first electrode in the thickness direction of the base material, arranged in a state of being in contact with the base material having the base material interposed between the first electrode and the second electrode, and arranged so as to have a portion overlapping with the first electrode when viewed in a direction of spacing from the first electrode, wherein the self-capacitance electrode is connected to a first connection portion for measurement of capacitance by the self-capacitance method and a grounded second connection portion via a switch such that the self-capacitance electrode can be selectively connected to the first connection portion and the grounded second connection portion;

a first measurement unit configured to measure capacitance between the self-capacitance electrode and the external object by the self-capacitance method when the self-capacitance electrode is connected to the first connection portion via the switch;

a second measurement unit configured to measure capacitance between the first electrode and the second electrode when the self-capacitance electrode is connected to the second connection portion via the switch; and a control unit configured to perform switching control of the switch, wherein the control unit is configured to perform switching control of the switch so as to periodically switch the connection between the self-capacitance electrode and the first connection portion or the second connection portion, the first measurement unit and the second measurement unit are configured to periodically execute the respective measurement processing, and the control unit is further configured to execute contact determination processing of determining whether the external object is in a state of continuous contact with the front surface of the base material based on at least one of measurement values of capacitance measured by the first measurement unit and the second measurement unit in each cycle of periodic switching control of the switch, and if a determination result of the contact determination processing is affirmative, make a time width for connecting the self-capacitance electrode to the second connection portion longer than a time width in a case where a determination result of the contact determination processing is negative in each cycle of the periodic switching control of the switch.

2. The measurement device according to claim 1, wherein the control unit is configured to, when the determination result of the contact determination processing is affirmative, make the time width for connecting the self-capacitance electrode to the second connection portion longer than the time width for connecting the self-capacitance electrode to the first connection portion in each cycle of the periodic switching control of the switch.

3. A measurement device, comprising:
a switch;
a capacitance sensor including:
 an elastically deformable base material formed by a dielectric;
 at least one self-capacitance electrode arranged in contact with the base material so as to be capable of detecting, by a self-capacitance method, capacitance between the base material and an external object that is outside the base material and can approach a front surface of the base material; and at least one first electrode separated from the self-capacitance electrode on a side farther away from the front surface of the base material than the self-capacitance electrode in a thickness direction of the base material, and arranged in a state of being in contact with the base material; and at least one second electrode separated from the first electrode on the side farther away from the front surface of the base material than the first electrode in the thickness direction of the base material, arranged in a state of being in contact with the base material having the base material interposed between the first electrode and the second electrode, and arranged so as to have a portion overlapping with the first electrode when viewed in a direction of spacing from the first electrode, wherein the self-capacitance electrode is connected to a first connection portion for measurement of capacitance by the self-capacitance method and a grounded second connection portion via the switch such that the self-capacitance electrode can be selectively connected to the first connection portion and the grounded second connection portion;

a first measurement unit configured to measure capacitance between the self-capacitance electrode and the external object by the self-capacitance method when the self-capacitance electrode is connected to the first connection portion via the switch;

a second measurement unit configured to measure capacitance between the first electrode and the second electrode when the self-capacitance electrode is connected to the second connection portion via the switch; and a control unit configured to perform switching control of the switch, wherein the control unit is configured to perform switching control of the switch so as to periodically switch the connection between the self-capacitance electrode and the first connection portion or the second connection portion, the first measurement unit and the second measurement unit are configured to periodically execute the respective measurement processing, and the control unit is configured to execute a first determination processing of determining whether the external object is in a state of continuous non-contact with the front surface of the base material based on at least one of measurement values of capacitance measured by the first measurement unit and the second measurement unit in each cycle of periodic switching control of the switch, and if a determination result of the first determination processing is affirmative, make a time width for connecting the self-capacitance electrode to the first connection portion longer than a time width in a case where a determination result of the first determination processing is negative in each cycle of the periodic switching control of the switch.

4. The measurement device according to claim 3, wherein the control unit is configured to, when the determination result of the first determination processing is affirmative, make the time width for connecting the self-capacitance electrode to the first connection portion longer than the time width for connecting the self-capacitance electrode to the second connection portion in each cycle of the periodic switching control of the switch.

\* \* \* \* \*